United States Patent Office 3,030,314
Patented Apr. 17, 1962

3,030,314
GLAZED SILICEOUS CATALYST
Harold E. Knowlton, Pleasant Hill, and Robert L. Flanders, San Anselmo, Calif., and Frank M. Parker, Salt Lake City, Utah, assignors to California Research Corporation, San Francisco, Calif., a corporation of Delaware
No Drawing. Filed Dec. 11, 1957, Ser. No. 701,990
12 Claims. (Cl. 252—432)

This invention relates to an improved catalyst particle having increased resistance against impact breakage and surface abrasion. More particularly, the invention is directed to the provision of a siliceous catalyst particle having a microporous, catalytically active core and provided over a substantial portion less than the whole of its external surface with an adherent, protective coating of a glaze comprised of silica and one or more compounds of boron, alkali metals or alkaline earth metals.

The present invention is applicable to a wide variety of catalysts and catalytic processes. However, while of appreciable benefit in fixed bed processes where it minimizes losses incurred during catalyst handling operations, it is of particular utility with operations involving a repeating cycle of alternate hydrocarbon conversion and catalyst regeneration steps wherein the catalyst is maintained in more or less continuous movement throughout the system. Operations of this character are best exemplified by the several catalytic processes for cracking petroleum hydrocarbons. Accordingly, the invention will be particularly described hereinafter as it relates to said operations.

In a moving-bed type of process (commonly designated as a Thermofor or TCC unit) there is employed a catalyst mass made up of small beads, pellets of extruded shapes ranging in diameter from about 500 microns to ¼ inch. The unit includes a reactor vessel and a regeneration vessel, together with associated catalyst elevators of the mechanical or gas lift types, along with suitable feed and product recovery facilities. Spent catalyst is discharged from the bottom of the catalytic reactor and passed to the regenerator for reactivation in the usual manner, following which the active catalyst is returned to the reactor section of the unit, either directly or by way of an intermediate hopper storage vessel. In this form of operation, it is important that the catalyst be made as strong and attrition-resistant as possible in order to minimize the production of catalyst fines. Such fines tend to classify or gather together in relatively compact masses in the reactor (as well as in other portions of the system) and thus cause channeling of the gases flowing through the catalyst bed, while also giving rise to an increased pressure drop across said bed and to other operating difficulties. For these and other reasons, it is necessary to effect continuous removal of fines from the system and to add fresh catalyst as required to maintain catalyst inventory at the desired level.

The catalyst particles employed in catalytic operations of the fluid type are much smaller than those employed in moving-bed processes and are suspended in the reactor by the vapors of the hydrocarbon to be cracked. Portions of the catalyst are continuously discharged from the reactor and are regenerated before being reintroduced into the liquid feed passing to the reactor. In this process, as in the moving bed type of operation, there is also a large amount of catalyst attrition, and the fines so produced must continuously be removed from the system if the same is to be operated in an efficient manner.

It will be seen from the above that the production of catalyst fines is a particularly serious problem in hydrocarbon cracking operations, as well as other catalytic processes wherein masses of particulate catalyst are maintained in motion throughout the system. The necessary replacement of fines with fresh catalyst can be very expensive. For example, in the case of petroleum cracking plants of even moderate capacity, expenditures for make-up catalyst may range from $1000 to $3000 or more per day. It is, therefore, a general object of this invention to provide a siliceous catalyst having greatly improved resistance against frictional and impact breakage even when being continuously moved through the system at relatively high velocities. The nature of this and other objects of the invention will be more fully apparent from a consideration of the descriptive portion to follow.

In accordance with the present invention, the foregoing and other objects are attained by the provision of catalyst particles having a microporous, catalytically active core, and having a substantial proportion less than the whole of the external, or macrosurface of the respective particles covered with an adherent, attrition-resistant glaze comprised of silica and one or more compounds of alkali metals, alkaline earth metals or boron. This glaze can be formed on the surface of the siliceous catalyst particles by a number of different methods, all of which involve contacting said particles with a total of from about 0.01 to 2% by weight of at least one material selected from the group consisting of compounds of alkali metals, alkaline earth metals and boron at temperatures above 1000° F. sufficiently high as to induce "fusion" between the added composition and adjacent portions of the siliceous catalyst surface.

In effecting such fusion it is not known whether or not the system passes through a molten or semi-molten state. However, it is believed that the glaze so formed is a silicate glass made up of silica and other materials associated therewith in the catalyst, together with the components of the added glazing composition.

The following compounds are representative of those which can be used either singly, or in any desired combination, to form the glazing composition for application to the catalyst particles: $NaCl$, $Na_2CO_3$, $KCl$, $K_2CO_3$, $LiF$, $Li_2SO_4$, $Cs_2CO_3$, $Rb_2CO_3$, $BeF_2$, $BeCl_2$, $BeO$, $BeCO_3$, $MgO$, $MgCl_2$, $MgSO_4$, $MgCO_3$, $CaO$, $Ca_3(PO_4)_2$, $CaF_2$, $CaCO_3$, Ca oleate, Ca naphthenate, Mg oxalate, Ca sulfonate, Na oleate, $SrO$, $SrCO_3$, $SrF_2$, $BaCl_2$, $BaCO_3$, $BaO$, Ba naphthenate, $B_2O_3$, $H_3BO_4$, $Na_2B_4O_7$, $Na_2B_4O_7 \cdot 10H_2O$, $Ca(BO_2)_2$, $CaB_4O_7$ and $Mg_3(BO_3)_2$. Particularly good results have been obtained with $CaCO_3$, $B_2O_3$, $Na_2B_4O_7$ (including hydrates), $H_3BO_3$, $BaCO_3$ and compositions containing 1–25% $MgO$, 30–75% $CaCO_3$ and 25–50% $Ca_3(PO_4)_2$. In this preferred grouping, it is intended that carbonates may be replaced in whole or in part by the equivalent oxides, since the latter are formed at glazing temperatures, in any event. In glazing catalysts for employment in petroleum hydrocarbon cracking operations, it is preferred not to utilize halides or alkali metal salts in the glazing composition.

The glaze formed on the catalyst particle incorporates the aforesaid additives (or such compounds as may be formed therefrom at the elevated temperatures employed, e.g., $CaCO_3 \rightarrow CaO$), along with silica, and such alkali metal oxides, alumina or other compounds as may be present in the catalyst composition. In the case of additive compositions rich in phosphate components, the resulting glaze may contain substantial amounts of metaphosphate glasses in addition to the silicate glasses present. In any even, the glaze comprises but a small percentage of the over-all catalyst weight. Thus, in the case of catalyst particles employed in moving-bed processes, the metal constituents of the glaze make up less than about 0.3%, by weight of the particle, and most frequently said content ranges from about 0.005 to 0.05 wt. percent, as determined by emission spectrograph methods.

Reference has been made above to the fact that the glaze extends over less than the entire macrosurface of the individual catalyst particles. Expressed otherwise, the catalyst particles may be said to bear a discontinuous glaze coating or one having a generally filigree-like appearance. Such discontinuity is in many cases evident on examining the surface under a microscope, though it is believed that whenever tests disclose the glazed catalyst to have substantially unimpaired catalytic and surface area characteristics, it may reasonably be concluded, apart from physical examination, that the glaze is discontinuous. Thus, the surface area of the blazed catalyst particles of this invention, as measured by $N_2$ adsorption methods, is normally at least 90% that of the corresponding unglazed particles, and more frequently the respective surface areas of the glazed and unglazed materials appear to be substantially the same. Likewise, in the case of catalyst particles employed in moving-bed processes at least, glazing does not effect any immediate impairment in catalyst activity as determined by "Cat. A" methods or by an analysis of the product yield structure in actual plant operation.

By employing a catalyst comprised of glazed particles, it is found possible to reduce catalyst losses in the form of fines and other small fragments by a substantial margin. This reduction in catalyst losses is frequently as much as 50 to 90%, particularly in systems employing a moving catalyst bed. The resultant savings in catalyst replacement costs alone are large, and when coupled with the enhanced processing advantages which obviously accrue as the content of catalyst fines in the system is reduced, the value of the present invention becomes even greater.

The glaze employed herein can be formed on the surface of a wide variety of siliceous catalyst particles, especially those containing above about 50% by weight of silica. Representative materials falling into this category are the various natural and treated clays of the bentonite and kaolin types, and the many synthetically prepared silica catalysts, including those containing one or more other oxides such as alumina, magnesia, zirconia or the like, as heretofore proposed for admixture with silica in preparing catalysts employed in various cracking operations. These synthetic catalysts usually contain about 70–90% $SiO_2$.

The aforesaid siliceous catalyst particles can be glazed in either the fresh condition or following plant usage and regeneration in a hydrocarbon conversion operation. Further, it is also possible to supply the desired glaze-forming additives to the catalyst surfaces at any stage after the catalyst particle has been shaped and, if desired, prior to such final drying, calcining and/or tempering operations as may otherwise be required. Likewise, having thus deposited the glaze-forming additives on the catalyst surfaces, the actual step of forming the glaze (involving the use of suitably elevated temperatures, as discussed hereinbelow) may also be practiced prior to said catalyst finishing operations, in conjunction therewith or as an incident thereof, or even following the completion of the catalyst preparatory steps, per se.

It has been found that the glaze can be formed on the catalyst surface by a number of methods. Thus, an appropriate amount of a suitable glazing composition can be applied to the catalyst surfaces either in the form of a dry powder or as a slurry or other dispersion in a liquid vehicle. The coated catalyst is then heated to temperatures of from about 1400 to 2000° F. or more for several minutes to form the glaze system. In operations of this character, the particular temperatures to be employed will depend somewhat on the composition of the glazing material and that of the underlying catalyst particle, it being known that silicate glasses are formed over a relatively wide temperature range. An appropriate temperature to be used for any given compostion can readily be determined by laboratory experiment, the temperature chosen for actual plant usage preferably being as low as possible.

Another and preferred glazing method (which lends itself well to the treatment of either fresh catalyst or that being circulated in a hydrocarbon cracking unit, and which requires no control of the glazing temperature) comprises supplying the glazing composition to the catalyst surfaces in conjunction with a normally liquid hydrocarbon (e.g., a heavy gas oil or other suitable feed stock to a catalytic cracking unit) at temperatuers sufficiently high to effect hydrocarbon vaporization and attendant formation of significant amounts of a carbonaceous residue on the catalyst. In thus supplying the glazing composition to the catalyst, the composition may be added as a dispersion in the hydrocarbon (in the form of a solution, slurry or other admixture), or the composition may be first applied to the catalyst surfaces as a dry powder, aqueous slurry or the like, following which the hydrocarbon is applied to the dry, composition-bearing catalyst particles. As the next step in the process, the carbonaceous residue is burned from the catalyst as the latter is subjected to temperatures above about 1000° F. in the presence of a free oxygen-containing gas. In such burning or regeneration step the catalyst macrosurfaces evidently reach temperatures sufficiently high as to achieve glaze formation in all instances.

In practicing the foregoing catalyst burning method, it is preferable to employ catalyst particles having relatively clean surfaces such as those presented by fresh or regenerated catalyst. However, the surface may already be partially glazed as a result of previous treatment, in which event the existing glaze is reinforced and extended.

The examples given below illustrate the invention in various of its embodiments.

EXAMPLES 1–9

In the operations covered by these examples, a glaze was provided on synthetic, silica-alumina beads having an average diameter of about ⅛ inch and containing approximately 87% $SiO_2$ and 13% $Al_2O_3$. These beads represented an equilibrium mixture withdrawn from a moving bed catalytic cracking unit of the bucket lift type. The technique employed in glazing the catalyst particles was to select a 600 g. sample of essentially whole catalyst particles and to bring said sample to 900° F. in a rotating muffle furnace capable of constantly turning the mixture. The heated catalyst particles (which were relatively free of any carbonaceous deposits) were then sprayed over the course of one minute with 30 cc. of a high boiling gas oil containing a total of 1.38 g. of the desired glaze-forming additives, said additives being present in the form of a dispersion of a finely divided powder in the oil. This represented the addition of approximately 0.23% of the additive, or additive composition, based on catalyst weight. Following the addition of the oil containing the glaze-forming additives, the temperature of the mixture was gradually raised to 1100° F. over the course of the ensuing 10 minutes. During the last seven minutes of said period, and for the next 33 minutes, air was passed through the hot (1100° F.) catalyst to burn the carbonaceous deposits present thereon. Steam, at the rate of 90 cc. $H_2O$/hr., was added during the entire glazing operation, the more closely to simulate conditions encountered in actual operation of the refinery unit.

The treated catalyst beads, which now appeared to have a discontinuous, filigree-like coating of glaze thereon (calculated as being of the general order of 0.02% of the over-all catalyst weight) were cooled and tested for resistance to loss by attrition. In making this test, 200 g. of glazed beads of a size sufficient to be retained on a 10-mesh screen were placed in a unit having a closed, circular path whereby the beads were reintroduced every few seconds during the test period into a rising air blast for discharge against the lower side of a steel plate having a dependent skirt portion serving to guide the beads into the lower portion of the unit for reintroduction into the air stream. Portions of the fines produced during the test were carried out with the escaping lift gases, while the remaining fines and other small catalyst fragments formed were separated as the beads remaining on a 10-mesh screen were segregated and weighed. The difference in weight between the original sample (200 g.) and that of the on-10-mesh material remaining at the conclusion of the run was then determined and compared with that experienced by the unglazed "control," the percent improvement in attritional loss so calculated being given in Table I below.

*Table I*

| Example No. | Additive Composition (Relative Percent of 1.38 g. Total) | | Improvement In Attrition Loss, Percent |
|---|---|---|---|
| 1 | $CaCO_3$ | 100 | 28 |
| 2 | $Ca_3(PO_4)_2$ | 100 | 30 |
| 3 | $MgO$ | 100 | 8 |
| 4 | {$CaCO_3$ | 60 | } 37 |
|   | {$Ca_3(PO_4)_2$ | 40 | |
| 5 | {$Ca_3(PO_4)_2$ | 81 | } 36 |
|   | {$MgO$ | 19 | |
| 6 | {$CaCO_3$ | 85 | } 21 |
|   | {$MgO$ | 15 | |
| 7 | {$CaCO_3$ | 52 | } 45 |
|   | {$Ca_3(PO_4)_2$ | 39 | |
|   | {$MgO$ | 9 | |
| 8 | {$CaCO_3$ | 50 | } 35 |
|   | {$Na_2CO_3$ | 50 | |
| 9 | $Na_2CO_3$ | 100 | 25 |

It will be observed from the foregoing examples that catalyst masses made up of glazed, siliceous particles are much more resistant to abrasion and to impact breakage than the corresponding unglazed materials. This increased attrition-resistance is accompanied in many instances by improved catalyst selectivity, as reflected in an increase in gasoline production and by a decrease in the amount of feed going to coke and dry gas, as measured by the "Cat. A" method (J. Alexander and H. G. Shimp, National Petroleum News (1944), vol. 36, at page R–537; J. Alexander, Proc. Am. Petroleum Inst. (1947), vol 27, at page 51). Thus, the unglazed catalyst treated in the foregoing examples, which is representative of plant mixtures and has a surface area of 139 m.²/g., showed a gasoline yield of 29.4% and coke and dry gas yields of 2.4% and 5.6%, respectively, when tested by the Cat. A method. In contrast, the glazed catalyst of Example 7, which, in turn, is considered to be a fully representative, glazed catalyst material of this invention, and which has a surface area of 137–142 m.²/g., showed gasoline, coke and dry gas yields of 30.4%, 2.1% and 4.2%, respectively, in Cat. A. tests.

EXAMPLES 10–17

The operations covered in these examples were conducted in the same general fashion as those of Examples 1–9. Here, however, the catalyst employed was made up of small (⅛ x ¼") extruded pellets of an activated kaolin clay catalyst containing approximately equal amounts of silica and alumina. In the case of Examples 10–15 the glaze was laid down on a fresh catalyst, while that of Examples 16 and 17 was formed on an equilibrium mixture withdrawn from a moving-bed cracking unit. Table II below shows the benefits obtained in the indicated glazing treatments.

*Table II*

| Example No. | Additive Composition (Relative Percent of 1.38 g. Total) | | Improvement In Attrition Loss, Percent |
|---|---|---|---|
| 10 | $BaCO_3$ | 100 | 42.5 |
| 11 | {$BaCO_3$ | 52 | } 24.6 |
|    | {$Ca_3(PO_4)_2$ | 40 | |
|    | {$MgO$ | 8 | |
| 12 | $CaF_2$ | 100 | 25.2 |
| 13 | $CaCO_3$ | 100 | 31.2 |
| 14 | $Na_2B_4O_7 \cdot 10H_2O$ | 100 | 31.7 |
| 15 | $BaCl_2$ | 100 | 37.8 |
| 16 | $BaCO_3$ | 100 | 19.1 |
| 17 | {$Ca_3(PO_4)_2$ | 50 | } 14.9 |
|    | {$CaCO_3$ | 50 | |

EXAMPLES 18–23

The operations covered by these examples were also conducted under essentially the same conditions as described above in connection with Examples 1–9, except that here the catalyst being glazed was an extrudate formed from activated halloysite clay. Table III presents data obtained with this catalyst, Examples 18 and 19 involving the glazing of fresh catalyst, while Examples 20–23 are based on a similar treatment of an equilibrium catalyst from a moving-bed type of cracking unit.

*Table III*

| Example No. | Additive Composition (Relative Percent of 1.38 g. Total) | | Improvement In Attrition Loss, Percent |
|---|---|---|---|
| 18 | $CaF_2$ | 100 | 60.4 |
| 19 | $BaCO_3$ | 100 | 51.1 |
| 20 | $BaCO_3$ | 100 | 43 |
| 21 | {$CaF_2$ | 50 | } 53.8 |
|    | {$Ca_3(PO_4)_2$ | 50 | |
| 22 | $H_3BO_3$ | 100 | 29.9 |
| 23 | {$H_3BO_3$ | 50 | } 28.4 |
|    | {$Ca_3(PO_4)_2$ | 50 | |

EXAMPLES 24 AND 25

These operations were conducted in the same general fashion, and with the same catalyst, as those of Examples 1–9. Here, however, the glazing composition (51% $CaCO_3$, 41% $Ca_3(PO_4)_2$, 8% $MgO$) was added to the hot catalyst in the muffle furnace either as a water slurry (Example 24) or as a dry powder (Example 25), each prior to the addition of the gas oil at 900° F. The glazed catalyst of Example 24 evidenced a 23% improvement in attrition resistance, while that of Example 25 was 40%.

EXAMPLE 26

In this test freshly prepared bead catalyst (87% silica, 13% alumina) was thoroughly mixed at room temperatures with 0.23 wt. percent of a powdered glazing composition containing 41% $Ca_3(PO_4)_2$, 51% $CaCO_3$ and 8% $MgO$. The resulting mixture was then brought rapidly to 1500° F. and held there for 30 minutes. This treatment effectively glazed the catalyst, as evidenced both by visual observation as well as by an improvement of 29% in attrition resistance, as measured in the test equipment described in connection with Examples 1–9.

EXAMPLE 27

This example illustrates the manner in which the process of this invention is employed in connection with a moving-bed catalytic cracking unit of the elevator lift type, the spent catalyst being so lifted from the reactor to the top of the regenerator and from the regenerator to the hopper above the reactor. The catalyst employed in the unit (wherein the total catalyst inventory is approximately 650 tons) is made of synthetically prepared, silica-alumina beads containing about 87% silica and 13% alumina, said beads having an average diameter of approximately ⅛″.

Previous operation of this unit disclosed that catalyst attrition losses averaged approximately 2.6 tons per day. This loss was reduced to a value of about 1.2 tons per day by a practice of the following glazing procedure: an aqueous slurry (containing approximately one pound of dry chemicals per gallon of water) was made up from a powdered additive composition containing 41%

$$Ca_3(PO_4)_2$$

51% $CaCO_3$ and 8% $MgO$. This slurry was continuously pumped at a rate of 350 gallons per day into the liquid feed traveling to the reactor. By the end of the 10th day, when a total of 0.25% of the chemicals composition (on a dry weight basis) had been added to the unit, in terms of the 650-ton catalyst inventory, it was found that the catalyst manifested a glaze of the desired character, and that the daily catalyst attrition losses had been reduced to a level of approximately 1.2 tons per day. It was further found that catalyst losses could be maintained at this level, which appeared to be minimal for the system, by thereafter adding the slurry at the reduced rate of approximately 200 gallons per day, representing the addition to the catalyst of about 0.015% chemicals, per day, on a dry weight basis.

We claim:

1. A siliceous catalyst particle having a microporous, catalytically active core comprised of a siliceous material and having a substantial proportion less than the whole of its macrosurface covered with an adherent, attrition-resistant, essentially catalytically inert glaze comprised of silica and at least one compound selected from the group consisting of alkali metal, alkaline earth metal and boron compounds, said glaze formed by contacting said core with at least one inorganic compound selected from the group consisting of alkali metal, alkaline earth metal and boron compounds at temperatures above 1000° F. sufficiently high to induce fusion between the surface of said core and said inorganic compounds brought into contact therewith.

2. A method of providing a substantial proportion less than the whole of the macrosurface of a siliceous catalyst particle with an adherent, attrition-resistant, essentially catalytically inert glaze, which comprises contacting said particle with a total of from about 0.01 to 2% by weight of at least one material selected from the group consisting of inorganic compounds of alkali metals, alkaline earth metals and boron at temperatures above 1000° F. sufficiently high to induce fusion between the siliceous catalyst surface and said materials brought into contact therewith.

3. A method of providing a substantial proportion less than the whole of the macrosurface of a synthetic, silica-alumina cracking catalyst particle with an adherent, attrition-resistant, essentially catalytically inert glaze, which comprises contacting said particle with a total of from about 0.01 to 2% by weight of an adidtive composition comprising at least one inorganic alkaline earth metal compound at temperatures above 1000° F. sufficiently high as to induce fusion between the siliceous catalyst surface and the additive composition, said composition being substantially free of halogen components.

4. The method of claim 3 wherein the additive composition employed comprises calcium carbonate.

5. The method of claim 3 wherein the additive composition employed comprises barium carbonate.

6. The method of claim 3 wherein the additive composition employed comprises from 1 to 25% magnesium oxide, 30 to 75% calcium carbonate and 25 to 50% calcium phosphate.

7. A method of providing a substantial proportion less than the whole of the macrosurface of an activated, natural clay cracking catalyst particle with an adherent, attrition-resistant, essentially catalytically inert glaze, which comprises contacting said particle with a total of from about 0.01 to 2% by weight of an additive composition containing at least one inorganic compound of boron at temperatures above 1000° F. sufficiently high as to induce fusion between the siliceous catalyst surface and the additive composition, said composition being free of halogen and alkali metal constituents.

8. The method of claim 7 wherein the composition employed comprises $H_3BO_3$.

9. The method of claim 8 wherein the composition employed comprises $B_2O_3$.

10. A method of preparing an improved siliceous catalyst particle, which comprises contacting the macrosurface of said particle with a normally liquid hydrocarbon and with a total of from about 0.01 to 2% by weight of an additive composition comprising at least one inorganic material selected from the group consisting of alkali metals, alkaline earth metals and boron; heating the resulting catalyst particle to a temperature sufficiently high to effect volatilization of the hydrocarbon and formation of a carbonaceous deposit on the particle; and thereafter combusting said carbonaceous deposit in the presence of a free oxygen-containing gas at temperatures above 1000° F. with attendant formation of an essentially catalytically inert glaze extending over a substantial proportion less than the whole of the macrosurface of the catalyst particle.

11. The method of claim 10 wherein the additive composition is brought into contact with the catalyst surface prior to contacting the latter with the hydrocarbon.

12. The method of claim 10 wherein the additive composition is supplied to the catalyst surface as a dispersion in the hydrocarbon.

References Cited in the file of this patent

UNITED STATES PATENTS

| | | |
|---|---|---|
| 2,357,254 | Danforth | Aug. 29, 1944 |
| 2,371,069 | Ruthruff | Mar. 6, 1945 |
| 2,644,799 | Robinson | July 7, 1953 |
| 2,885,368 | Hess et al. | May 5, 1959 |

UNITED STATES PATENT OFFICE
CERTIFICATE OF CORRECTION

Patent No. 3,030,314

April 17, 1962

Harold E. Knowlton et al.

It is hereby certified that error appears in the above numbered patent requiring correction and that the said Letters Patent should read as corrected below.

Column 1, line 35, for "of", second occurrence, read -- or --; line 68, for "most" read -- must --; column 3, line 3, for "even" read -- event --; line 22, for "blazed" read -- glazed --.

Signed and sealed this 28th day of August 1962.

(SEAL)
Attest:

ESTON G. JOHNSON
Attesting Officer

DAVID L. LADD
Commissioner of Patents